United States Patent [19]

Aihara et al.

[11] Patent Number: 5,144,720
[45] Date of Patent: Sep. 8, 1992

[54] RELEASABLE DOUBLE-HINGE DEVICE FOR AN AUTOMOBILE CONSOLE BOX

[75] Inventors: Masahiro Aihara; Hiroyuki Suzuki, both of Yokohama, Japan

[73] Assignee: Kato Hatsujo Kaisha, Ltd., Yokohama, Japan

[21] Appl. No.: 712,889

[22] Filed: Jun. 12, 1991

[30] Foreign Application Priority Data

Jan. 16, 1991 [JP] Japan ................................. 3-15825

[51] Int. Cl.$^5$ .............................................. E05D 15/50
[52] U.S. Cl. ......................................... 16/232; 16/231
[58] Field of Search ................................. 16/231, 232

[56] References Cited

U.S. PATENT DOCUMENTS

| | | | |
|---|---|---|---|
| 2,817,870 | 12/1957 | Howell | 16/231 |
| 3,628,217 | 12/1971 | Schaber et al. | 16/190 |
| 3,724,021 | 4/1973 | Lautenschlaeger | 16/163 |
| 3,728,819 | 4/1973 | Golbach et al. | 49/216 |
| 3,772,736 | 11/1973 | Hettich et al. | 16/180 |
| 3,977,043 | 8/1976 | Zemig | 16/137 |
| 3,978,549 | 9/1976 | Vitt | 16/129 |
| 4,126,964 | 11/1978 | Anderson | 49/183 |

FOREIGN PATENT DOCUMENTS

| | | |
|---|---|---|
| 58-86277 | 5/1958 | Japan . |
| 59-52183 | 3/1959 | Japan . |
| 60-90042 | 6/1960 | Japan .. |
| 60-242275 | 12/1985 | Japan . |
| 1-86674 | 6/1989 | Japan . |

Primary Examiner—Robert L. Spruill
Assistant Examiner—Carmine Cuda
Attorney, Agent, or Firm—Foley & Lardner

[57] ABSTRACT

A releasable double-hinge device for an automobile console box that makes the box lid capable of being opened from either lateral side by simply sliding it sideways. The opened lid can be closed by a simple action of pushing it down. A number of pivotal pillars 3, each provided with a lock shaft 3b, are pivotally arranged on respective anchor pins 3d and kept upright along each of the lateral edges of the box main body 1 by means of respective recoil springs 4. A same number of lock sections 2a are arranged along and under each of the lateral edges of the box lid 2 in such a manner that the lock shafts of the pivotal pillars are received in respective slots 2b of the lock sections 2a to form a hinge. With such an arrangement, the box lid 2 may be opened by simply moving it sideways so that the pivotal pillars 3 are tilted against the resilient force of the recoil springs until all the lock shafts 3b on a lateral edge are released from the respective lock sections 2a and the box lid 2 is rotated around the other lateral edge. The opened box lid 2 may be closed by simply pushing it down until the lock shafts 3b are tilted as they are pressed by the respective inclined edges 2d of the corresponding lock sections 2a and then made to slide into the respective slots 2 by the resilient force of the recoil springs 4.

3 Claims, 5 Drawing Sheets

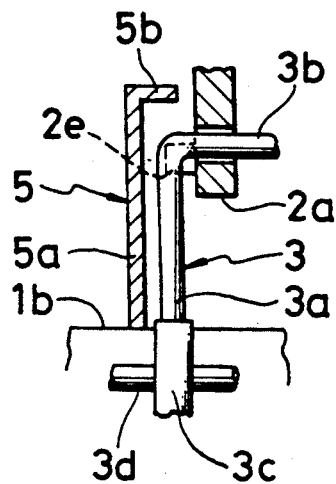
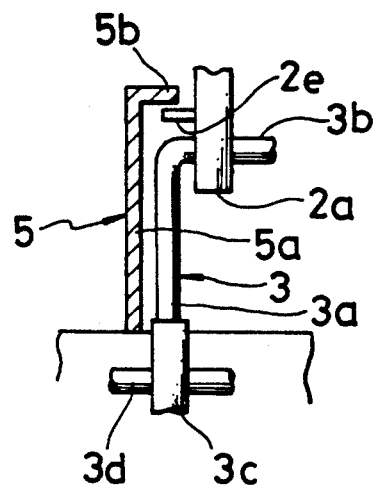
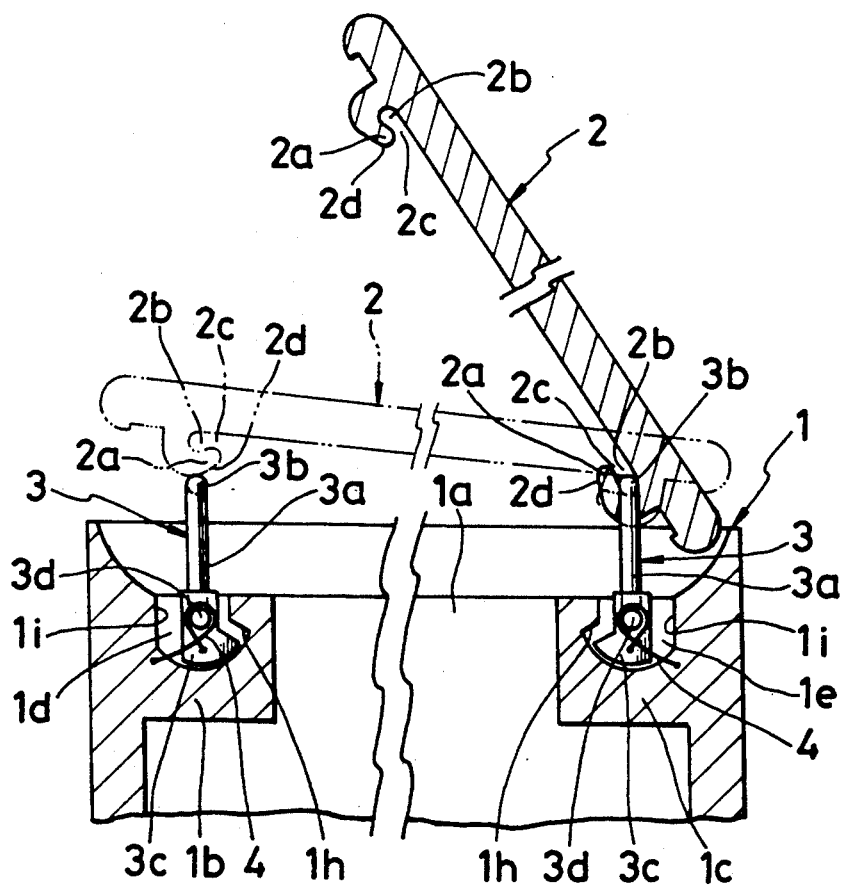

2

RELEASABLE DOUBLE-HINGE DEVICE FOR AN AUTOMOBILE CONSOLE BOX

BACKGROUND OF THE INVENTION

1. Field of the Invention

This invention relates to a releasable double-hinge device to be suitably used for the lid of an automobile console box or an electric rice boiler or the door of a cabinet in order for the lid or the door to be capable of being opened from either of opposite ends and totally removed.

2. Background Information

As shown in FIG. 8 of the accompanying drawings, an automobile is normally provided at a side of the driver's seat with a console box b for storing small items having a lid c which is preferably hinged not only at the front end d but also at the rear end e for user's convenience.

FIGS. 9(A) and 9(B) show that the lid of the console box is hinged at both the front and rear ends and therefore can be swung open in the direction of not only arrow f but also arrow g. FIG. 9(C) shows that the lid c can be totally removed from the console box whenever necessary. FIG. 10(A) and 10(B) show a known releasable double-hinge device to be used for such a console box.

With a known releasable double-hinge device as illustrated in FIG. 10(A) and disclosed in Japanese Patent Tokkai Shou No. 60-242275, the box main body h is provided at opposite sides with a pair of oppositely arranged lock holes i, into which a pair of lock pins k arranged on the corresponding side of the lid j can be respectively introduced first by depressing them by means of a hand-operated implement (not shown) against the resilient force of a built-in spring and thereafter by releasing them into the respective holes. Obviously, such an operation is cumbersome as it requires manipulation of an implement, particularly so when the lid j is removed because both hands should be used for the operation.

With another known releasable double-hinge device as illustrated in FIG. 10(B) and disclosed in Japanese Patent Jitsukai Shou No. 60-90042, the box main body 1 is provided at each of a pair of opposing sides with a pair of oppositely arranged pins m and n, which are received by respective C-shaped deformable bearings p or g arranged on the corresponding edges of the lid o. The lid o equipped with such a double-hinge device would not rotate smoothly when the engagement between the pin and the bearing is loose. However, when a smoothly rotatable engagement is achieved between the pin and the bearing, it requires considerable effort to remove or replace the lid.

A similar device is disclosed in Japanese Patent Jitsukai Hei No. 1-86674 involving a lever which is operated to install a lid. While a door lock device designed for a refrigerator and disclosed in Japanese Patent Tokkai Shou No. 59-52183, and a door fitting structure disclosed in Japanese Patent Tokkai Shou No. 58-86277 may fall in the same category as the present invention, they have rather complicated configurations involving latches, springs and knobs.

In view of the problems and disadvantages of the known devices, it is therefore an object of the present invention to provide a releasable double-hinge device for an automobile console box constituted by a box main body having at the top an opening and a box lid for removably covering the opening of the box main body. The double-hinge device comprises two sets of an identical number of pivotal pillars arranged along the lateral edges of the box main body, each pivotal pillar having an upright member, an anchor pin to which the base portion of said upright member is pivotally anchored at the lower end in such a manner that it may be tilted left or right from an upright position through a given angle and returned to its upright position by means of a recoil spring, a horizontal lock shaft extending from the top of the upright member along the lateral edge where the pivotal pillar stands, and two sets of the same number of lock sections arranged at corresponding respective positions under and along the lateral edges of the box lid, each lock section having a slot for removably receiving a corresponding horizontal lock shaft in such a manner that said lock section and said lock shaft are released from each other along with the other lock sections and lock shafts on the same edge by laterally moving the box lid so that the box lid may be swung open around the opposite edge, said lock section further having an inclined edge for pressing itself against the lock shaft to tilt the pivotal pillar and guide the lock shaft into the slot to close and lock the box lid as the upright member is returned to the upright position by said recoil spring.

In a first modified arrangement of the releasable double-hinge device according to the invention, said slot of the lock section is open at the outer lower end so that the lock section and the lock shaft of the corresponding pivotal pillar may be released from each other by laterally moving the box lid. The pivotal pillar further comprises an anti-slip-out member provided with a stopper portion that a corresponding slider member on the box lid detachably abuts when the box lid is closed.

In a second modified arrangement of the releasable double-hinge device according to the invention, said pivotal pillar is pivotal to the outside by a small angle and pivotal to the inside by a larger angle. The slot of the lock section is open at the inner end in such a manner that, when each of the pivotal pillars arranged on either side of the box main body is tilted by said smaller angle, the lock shaft is urged to release itself from the slot by the resilient force of the recoil spring, while each of the pivotal pillars arranged on the opposite side of the box main body is tilted by said larger angle so that the corresponding lock section is releasable from the lock shaft of the pivotal pillar.

When the box lid is closed relative to the box main body equipped with a releasable double-hinge device according to the invention, all the lock shafts arranged on both lateral edges are engaged with the respective slots of the lock sections of the box lid so that it would not unintentionally open if it is simply pulled upward.

In order to open the box lid, first it is moved left or right until all the pivotal pillars on either lateral edge are tilted by a given angle against the resilient force of the recoil springs so that the lock shafts on the other edge are disengaged from the corresponding respective slots and the box lid may be swung open around said first edge. Similarly, if the box lid is moved in the opposite direction, it will become swingable around the other lateral edge.

When the box lid which is open is pushed down for closing, first the inclined edges of the lock sections of the open end of the box lid abut the corresponding respective lock shafts of the pivotal pillars arranged on that end to tilt them against the resilient force of the recoil springs until the lock shafts come to be automatically received and locked by the respective slots due to the resilient force of the springs.

After moving the box lid to either side and opening it at an edge, it may be totally removed from the box main body by moving it to the opposite direction and repeating a similar operation to disengage the lock shafts and the corresponding respective lock sections on the other edge.

With the first modified arrangement of the invention as described above, the slider members arranged on a lateral side of the box lid abut the corresponding respective stopper portions of the anti-slip-out members on the corresponding edge of the box main body and are held there by them so that the lock shafts of the box lid on that edge will not come out of the respective slots if the box lid is pulled up by force.

With the second modified arrangement of the invention as described above, since the pivotal pillars on a lateral edge of the box main body are tilted along with the accompanying lock shafts only through a small angle and would not be tilted any further when the box lid is moved sideways, the pivotal pillars store the force to regain their original upright position. The recoil springs that have been twisted through a small angle safely release the lock shafts from the slots of the respective lock sections.

Now the present invention will be described in greater detail by referring to the accompanying drawings that illustrate preferred embodiments of the invention.

BRIEF DESCRIPTION OF THE DRAWINGS

FIG. 4(A) is a sectional side view of one of the anti-slip-out members and its neighboring area when the box lid is closed and FIG. 4(B) is a view similar to FIG. 4(A) but where the box lid is opened.

FIG. 5 is a sectional front view of a second embodiment of the invention showing the opened box lid and only the principal area of the box main body.

DETAILED DESCRIPTION OF THE INVENTION

Figure 1:
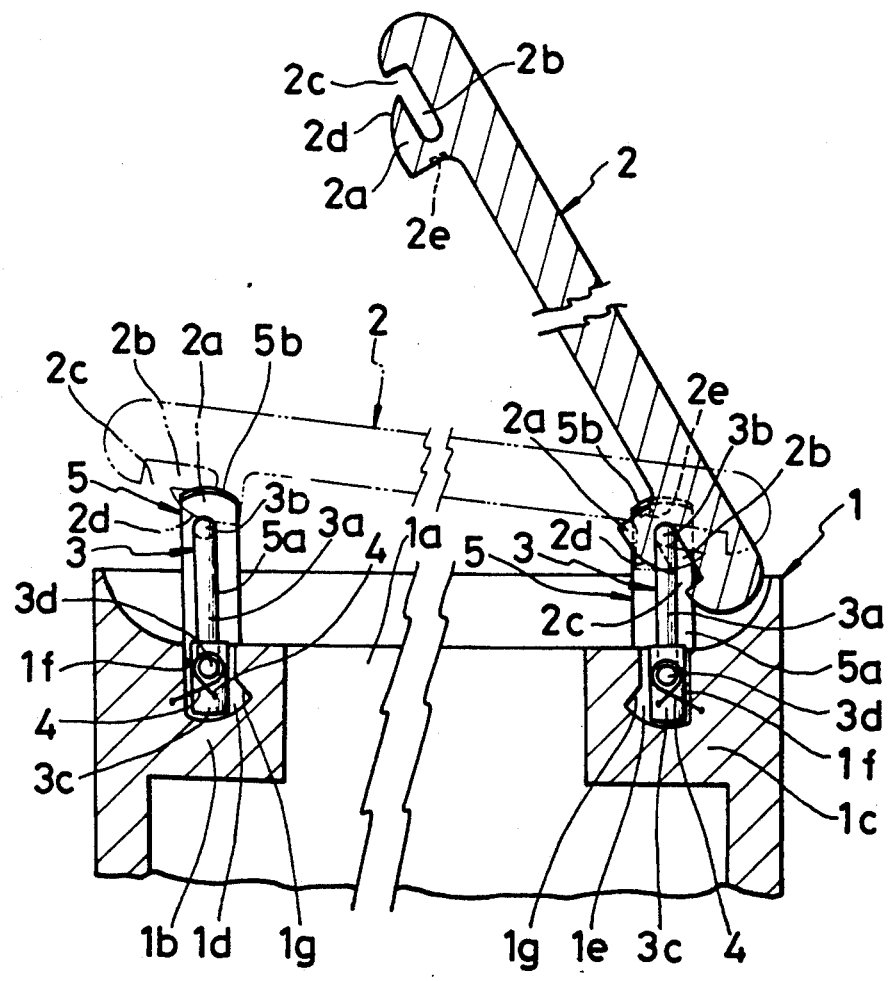
FIG. 1 is a sectional front view of a first embodiment of the invention showing the opened box lid and only the principal area of the box main body.
Figure 2:
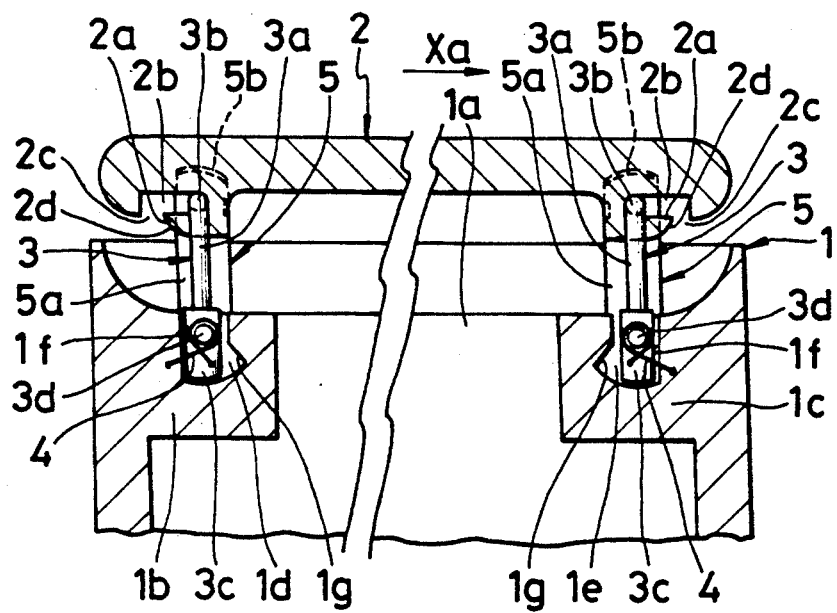
FIG. 2 is a view similar to FIG. 1 but showing the box lid in a closed condition.

Referring to FIGS. 1 and 2 showing a first preferred embodiment of the invention, reference numeral 1 denotes a box main body having an opening 1a and numeral 2 denotes a box lid to cover the opening 1a. On each of the opposite lateral edges 1b, 1c of the box main body, one or more than one pivotal pillars 3 are arranged, while a same number of lock sections 2a are disposed along each of the lateral edges of the box lid 2 at positions corresponding to those of the pivotal pillars 3.

Figure 3:
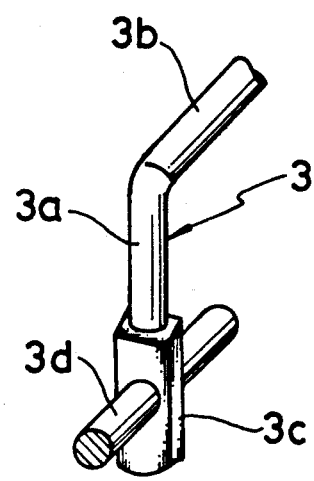
FIG. 3 is a perspective view of one of the pivotal pillars of the embodiment of FIG. 1 showing only its principal area.

As shown in FIG. 3, each of said pivotal pillars 3 comprises an upright member 3a and a horizontal lock shaft 3b connected to said upright member 3a at its top and arranged perpendicular to said upright member 3a. The pivotal pillars 3 are arranged along the lateral edges 1b, 1c of the box main body 1 where the upright member 3a stands, said upright member 3a having a thick base section 3c at its lower end accommodated in a corresponding one of cavities 1d, 1e formed on the lateral edges of the box main body along with an anchor pin 3d arranged in parallel with the lock shaft 3b.

Each of the cavities 1d, 1e has an upright outside wall 1f and a recessed inside wall 1g. The upright member 3a of the corresponding pivotal pillar 3 may not be inwardly tilted as it is blocked by said upright outside wall 1f, while it may be outwardly tilted by a given angle (typically approximately 30°) until it abuts the recessed inside wall 1g. The tilted pivotal pillar 3 is restored to its upright position by a recoil spring 4 whenever the force applied to it for tilting is removed. The recoil spring 4 is wound around the anchor pin 3d and its opposite ends are rigidly fitted to the pivotal pillar 3 and the box main body 1, respectively.

Each of said lock sections 2a of the box lid 2 is, as seen from FIGS. 1 and 2, made in the form of a two-forked section having a slot 2b between the branches running horizontal or in parallel with the box lid 2 and an opening 2c facing outward so that the corresponding lock shaft 3b may be engaged with and released from the lock section 2 by way of said opening 2c.

The lower edge 2d of the lock section 2a is rounded and inclined relative to the box lid 2 so that the front end of the inclined edge 2d is pointed outward and upward.

Referring to FIGS. 1 through 4(B), reference numeral 5 denotes an anti-slip-out member 5 comprising a support portion 5a standing upward from the lateral edge 1b or 1c and a stopper portion 5b laterally projecting from the top of the support portion 5a toward the corresponding pivotal pillar 3.

The corresponding lock section 2a comprises a slider member 2e that comes to abut the stopper portion 5b to prevent the lock section 2a of the box lid 2 from coming off from the lock shaft 3b when the closed box lid 2 is unintentionally lifted upward.

With an arrangement as described above, the lock shaft 3b of each of the pivotal pillar 3 which is kept standing upright by a recoil spring 4 is received at the remote end of the corresponding slot 2b of the box lid 2 and therefore the lock shaft 3b is engaged with the lock section 2a so long as the opening 1a of the box main body 1 is covered by the box lid 2.

If the box lid 2 is slidingly moved right as indicated by arrow Xa in FIG. 2 under this locked condition, it particularly slides relative to the lock shafts 3b of the pivotal pillars 3 arranged on the left edge of the box main body 1 because the pivotal pillars 3 are not capable of being tilted rightward with the box lid 2, whereas their counterparts 3 arranged on the right edge of the box main body 1 are tilted by a given angle so that their lock shafts 3b are moved rightward with the box lid 2 until all the lock shafts 3b along the left edge are released from the corresponding respective slots 2b by way of the respective openings 2c. If the left end of the box lid 2 is lifted under this condition, it will be swung open around the lock shafts 3b arranged along the right edge and closed, if necessary, by rotating the box lid 2 in the opposite direction. It may be needless to say that the box lid 2 may be opened the other way by carrying out a similar operation.

Note that none of the lock shafts 3b on the side that becomes the axis of rotation of the box lid 2 would come off from the corresponding slots 2b by the motion of lifting the box lid 2 upward for opening the same because the slider members 2e arranged on that side of the box lid 2 eventually come to abut the corresponding respective stopper portions 5b of the anti-slip-out members 5.

Now, if the box lid 2 is moved downward from the state as illustrated in FIG. 1, each of the lock sections 2a on the left side abuts the lock shaft 3b of the corresponding pivotal pillar 3 which is kept upright as indicated by a chained line in FIG. 1.

If the box lid 2 is pressed further downward, said pivotal pillar 3 is tilted outward along with the lock shaft 3b by said inclined edge 2d of the lock section 2a until the thick base section 3c abuts the recessed wall 1g so that the lock shaft 3b may enter the corresponding slot 2b by way of the opening 2c and the box lid 2 is consequently closed.

If, under the closed condition as illustrated in FIG. 2, the box lid 2 is slidingly moved right or left to release the left or right side lock shafts 3b from the corresponding respective lock sections 2a and thereafter moved to the opposite direction, the lock shafts 3b on the other side will also come out from the corresponding respective lock sections 2a. Therefore, the box lid 2 may be totally removed from the box main body 1 because there is not any abutment of the stopper portions 5b and the corresponding respective slider members 2e on that side.

Figure 6:
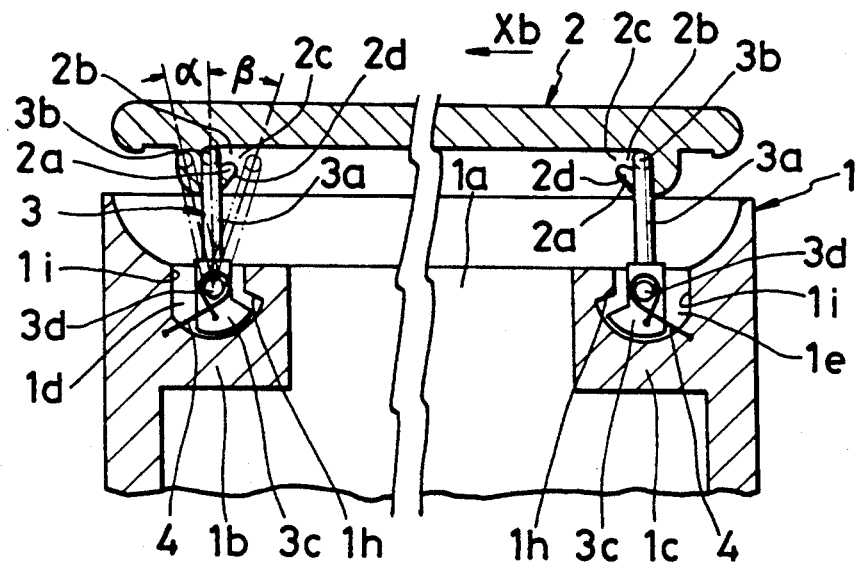
FIG. 6 is a view similar to FIG. 5 but showing the box lid when closed.
Figure 7:
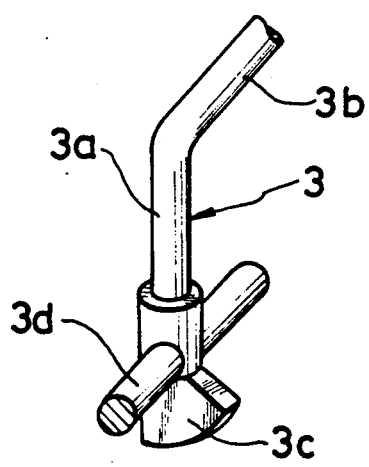
FIG. 7 is a perspective view of one of the pivotal pillars of the embodiment of FIG. 5 showing only its principal area.
Figure 8:
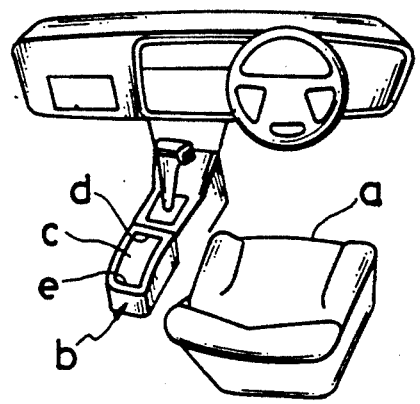
FIG. 8 is a perspective view of a known automobile console box.
Figure 9A:
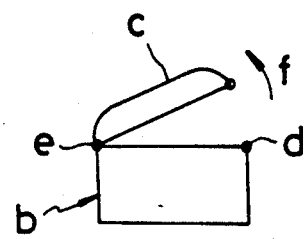
FIG. 9(A), 9(B) and 9(C) are schematic side views of the console box of FIG. 8 showing, respectively, when it is opened from the right, when it is opened from the left, and when the box lid is totally removed.
Figure 9B:
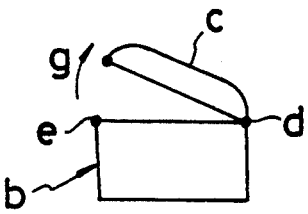
Figure 9C:
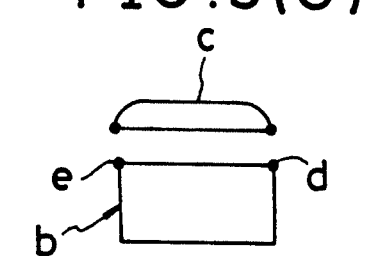
Figure 10A:
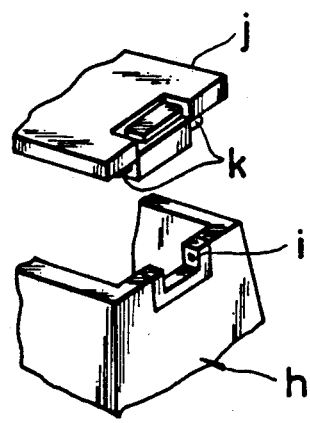
FIG. 10(A) is a partial perspective view of a known console box and FIG. 10(B) is a sectional side view of another known console box.
Figure 10B:
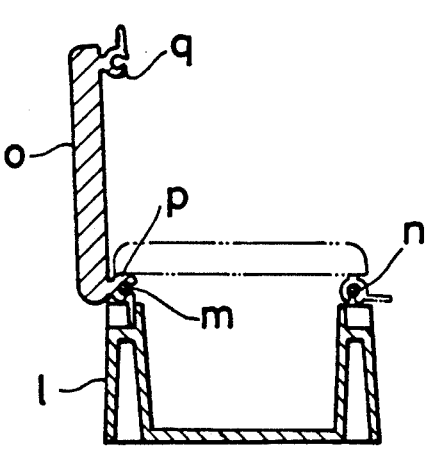

Now, referring to FIGS. 5 through 7 that illustrate a second preferred embodiment of the invention, this embodiment has a configuration similar to that of the first embodiment except for the following differences.

First, each of the pivotal pillars 3 arranged along the lateral edges 1b, 1c of the box main body 1 and held upright by a recoil spring 4 may be tilted not only outwardly but also inwardly by a given angle.

More specifically, each of the cavities 1d, 1e has a slightly recessed inside wall 1h and a more heavily recessed outside wall 1i so that the corresponding pivotal pillar 3 may be tilted outward by a smaller angle α of approximately 10° along with the lock shaft 3b until the thick base section 3c abuts the slightly recessed wall 1h whereas it may be tilted inward by a larger angle β of approximately 30° until the base section 3c abuts the more heavily recessed wall 1i.

The second difference between the two embodiments is that the each of the lock sections 2a, 2a of this embodiment has a two-forked section directed not outward but inward and a slot 2b between the two branches having an opening 2c at the innermost end thereof.

As a matter of course, the inclined and rounded edge 2d of the lock section 2a has a pointed front end directed inward and upward.

With this second embodiment, as in the case of the preceding embodiment, all the pivotal pillars 3 are standing upright with the lock shafts 3b deeply received by the corresponding respective slots 2b so long as the box lid 2 is closed as illustrated in FIG. 6.

If the box lid 2 is slidingly moved left as indicated by arrow Xb in FIG. 6 under this locked condition, all the pivotal pillars 3 on the left edge of the box main body 1 are tilted leftward along with the lock shaft 3b without being released from the corresponding respective lock sections 2a of the box lid 2 until the angle of tilting reaches the smaller angle α, or approximately 10°, and the movement of the box lid 2 is blocked. Under this condition, the recoil springs 4 store their respective resilient forces. Since each of the pivotal pillars 3 arranged along the right edge can be tilted by a larger angle β, or approximately 30° until its thick base section 3c abuts the corresponding heavily recessed wall 1i, the lock shafts 3b on the left side are securely released from the corresponding respective lock sections 2a through the openings 2c of the slots 2b under the effort of the recoil springs 4 that store in them their respective resilient forces if the box lid 2 is moved sufficiently leftward.

If the left end of the box lid 2 is lifted under this condition, it will be swung open around the lock shafts 3b arranged along the right edge and closed, if necessary, by rotating the box lid 2 in the opposite direction as illustrated in FIG. 5. It may be needless to say that the box lid 2 may be opened the other way by carrying out a similar operation and that, if required, the box lid 2 may be totally removed from the box main body 1 as in the case of the first embodiment.

As is apparent from the above description, with a releasable double-hinge device according to the invention which comprises two sets of a number of lock sections arranged along and under the lateral edges of the box lid of an automobile console box and engaged with corresponding lock shafts of respective pivotal pillars for secure rotation of the box lid around the lock shafts on either lateral side, the box lid can be swung open from the opposite lateral side by simply sliding the lid a short distance and without the use of any specifically designed tools.

Moreover, because of the provision of an inclined edge 2d for each of the lock sections and a recoil spring 4 for each of the pivotal pillars, the box lid is locked to the box main body as soon as it is closed. Also, the box lid can be totally removed from the box main body by simply sliding it leftward and then rightward or vice versa. A releasable double-hinge device according to the invention can be manufactured at reduced cost and is almost free from malfunctions.

With a first modified arrangement of the releasable double-hinge device as described earlier, since the slot of each of the lock sections is open at the outer lower end and each of the pivotal pillars can be tilted only outwardly, the box lid may be opened from either side as in the case of the original arrangement. Moreover, each of the pivotal pillars further comprises an anti-slip-out member provided with a stopper portion and a corresponding slider member on the box lid which detachably abuts when the box lid is closed. Therefore, the box lid will not unintentionally and undesirably come off from the box main body when it is being opened.

In a second modified arrangement of the releasable double-hinge device as described earlier, since each of the pivotal pillars can be tilted to the outside by a small angle and to the inside by a larger angle, and the slot of each of the lock sections is open at the inner end, the lock shafts of either side of the box main body lock sections under the effect of the corresponding recoil spring so that the operation of opening and removing the box lid may be easily and securely conducted.

What is claimed is:

1. A releasable double-hinge device for an automobile console box, the box comprising a box main body having an opening at a top portion thereof and a box lid for removably covering the opening of the box main body, the device comprising:
   two sets of an identical number of pivotal pillars arranged along opposite lateral edges of the box main body,
   each pivotal pillar including an upright member, a horizontal lock shaft extending perpendicularly from a top of the upright member parallel to the lateral edge, and a base section including an anchor pin to which a bottom of the upright member is attached,
   the body lateral edges having cavities formed therein, wherein each base section is disposed and pivotally anchored to the box main body, and each pivotal pillar tilting at least one of left and right from an upright position through given angles;
   a recoil spring which returns each pillar to the upright position; and
   two sets of the same identical number of lock sections located under and along opposite lateral edges of the box lid at positions corresponding to locations of the pivotal pillars on the box main body; wherein
   each lock section has a slot formed therein for removably receiving a corresponding horizontal lock shaft, the lock section and the lock shaft being released from each other along with the other lock sections and lock shafts on the same lateral edge by lateral movement of the box lid to a position in which the box lid is swung open around the opposite edge,
   each lock section further has an inclined edge which presses against the lock shaft and tilts the pivotal pillar so that the lock shaft is guided into the slot, and wherein
   the recoil spring returns the pivotal pillar to the upright position to close and lock the box lid.

2. A releasable double-hinge device for an automobile console box, the box comprising a box main body having an opening at a top portion thereof and a box lid for removably covering the opening of the box main body, the device comprising:
   two sets of an identical number of pivotal pillars arranged along opposite lateral edges of the box main body;
   each pivotal pillar including an upright member, a horizontal lock shaft extending perpendicularly from a top of the upright member parallel to the lateral edge, and a base section including an anchor pin to which a bottom of the upright member is attached,
   the body lateral edges having cavities formed therein, wherein each base section is disposed and pivotally anchored to the box main body, and each pivotal pillar tilting outwardly from an upright position through a given angle;
   a recoil spring for returning the pillar to the upright position; and
   two sets of the same identical number of lock sections located under and along opposite lateral edges of the box lid at positions corresponding to locations of the pivotal pillars on the box main body; wherein
   each lock section has a slot formed therein which is open at an outer lower end and which removably receives a corresponding horizontal lock shaft, the lock section and the lock shaft being released from each other along with the other lock sections and lock shafts on the same lateral edge by laterally movement the box lid to a position in which the box lid is swung open around the opposite edge,
   each lock section further has an inclined edge which presses against the lock shaft and tilts the pivotal pillar so that the lock shaft is guided into the slot,
   the recoil spring returns the pivotal pillar to the upright position to close and lock the box lid,
   each of the pivotal pillars on both lateral edges of the box main body further comprises an anti-slip-out member provided with a stopper portion, and wherein
   each of the lock sections on both lateral edges of the box main body further comprises a slider member, the slider member on the lock section detachably abutting the stopper portion when the box lid is opened or closed.

3. A releasable double-hinge device for an automobile console box, the box comprising a box main body having an opening at a top portion thereof and a box lid for removably covering the opening of the box main body, the device comprising:
   two sets of an identical number of pivotal pillars arranged along opposite lateral edges of the box main body,
   each pivotal pillar including an upright member, a horizontal lock shaft extending perpendicularly from a top of the upright member parallel to the lateral edge, and a base section including an anchor pin to which a bottom of the upright member is attached,
   the body lateral edges having cavities formed therein, wherein each base section is disposed and pivotally anchored to the box main body, each pivotal pillar on one lateral edge of the box main body tilts outwardly only through a first angle and does not tilt any further when the box lid is moved sideways, and wherein each pivotal pillar on the other lateral edge of the box main body tilts inwardly through a second angle, the second angle being larger than the first angle;
   a recoil spring for returning the pivotal pillars to the original upright position; and
   two sets of the same identical number of lock sections located under and along opposite lateral edges of the box lid at positions corresponding to locations of the pivotal pillars on the box main body; wherein
   each lock section has a slot formed therein which is open at an inner end and which removably receives a corresponding horizontal lock shaft, the lock section and the lock shaft being released from each other along with the other lock sections and lock shafts on the same lateral edge where the pivotal pillars are tilted outwardly through the first angle by lateral movement of the box lid to a position in which the box lid is swung open around the opposite edge,
   each lock section further has an inclined edge which presses against the lock shaft and tilts the pivotal pillar so that the lock shaft is guided into the slot, and wherein
   the recoil spring returns the pivotal pillar to the upright position to close and lock the box lid.

* * * * *